United States Patent
de Heer

(10) Patent No.: US 8,341,550 B2
(45) Date of Patent: Dec. 25, 2012

(54) USER GENERATED TARGETED ADVERTISEMENTS

(75) Inventor: David L. de Heer, Woodside, CA (US)

(73) Assignee: Microsoft Corporation, Redmond, WA (US)

( * ) Notice: Subject to any disclaimer, the term of this patent is extended or adjusted under 35 U.S.C. 154(b) by 442 days.

(21) Appl. No.: 12/368,615

(22) Filed: Feb. 10, 2009

(65) Prior Publication Data
US 2010/0205562 A1 Aug. 12, 2010

(51) Int. Cl.
| | |
|---|---|
| G06F 3/048 | (2006.01) |
| G06F 3/00 | (2006.01) |
| G06F 13/00 | (2006.01) |
| G06Q 30/00 | (2012.01) |
| H04N 7/10 | (2006.01) |
| H04N 7/025 | (2006.01) |
| H04N 5/445 | (2011.01) |
| H04N 7/173 | (2011.01) |

(52) U.S. Cl. .................... 715/810; 705/14.4; 705/14.41; 705/14.45; 705/14.46; 705/14.49; 705/14.5; 705/14.55; 705/14.58; 705/14.66; 705/14.67; 705/27.1; 725/32; 725/34; 725/35; 725/36; 725/44; 725/47; 725/91

(58) Field of Classification Search .................. 715/810; 705/14.4, 14.41, 14.45, 14.46, 14.49, 14.5, 705/14.55, 14.58, 14.66, 14.67, 27.1; 709/217, 709/219, 231; 725/32, 34–36, 39, 42, 44, 725/47, 91

See application file for complete search history.

(56) References Cited

U.S. PATENT DOCUMENTS

| | | | |
|---|---|---|---|
| 5,260,778 A | 11/1993 | Kauffman et al. | |
| 6,760,916 B2 | 7/2004 | Holtz et al. | |
| 7,340,527 B2 | 3/2008 | Tsusaka et al. | |
| 2002/0067730 A1* | 6/2002 | Hinderks et al. | 370/395.52 |
| 2002/0083444 A1* | 6/2002 | Blasko et al. | 725/35 |
| 2002/0124182 A1* | 9/2002 | Bacso et al. | 713/200 |
| 2002/0169540 A1* | 11/2002 | Engstrom | 701/200 |
| 2003/0070167 A1* | 4/2003 | Holtz et al. | 725/32 |
| 2003/0191816 A1 | 10/2003 | Landress et al. | |

(Continued)

FOREIGN PATENT DOCUMENTS

CN 1952968 4/2007

(Continued)

OTHER PUBLICATIONS

Jenson, Jens .F., "Interactive Television: New Genres, New Format, New Content", Proceedings of the Second Australasian Conference on Interactive Entertainment, retrieved at <<http://delivery.acm.org/10.1145/1110000/1109194/p89-jensen.pdf?key1=1109194&key2=9258018221&coll=GUIDE&dl=GUIDE&CFID=12835699&CFTOKEN=41314040, Nov. 23-25, 2005, pp. 89-96.

(Continued)

*Primary Examiner* — Kieu Vu
*Assistant Examiner* — Eric J Bycer
(74) *Attorney, Agent, or Firm* — Wolfe-SBMC

(57) ABSTRACT

User generated targeted advertisements is described. In embodiments, a selection of an advertisement template for a targeted advertisement can be received when initiated by a user. Advertisement content to incorporate in the advertisement template can be received, as well as selections of recipients to receive the targeted advertisement. A program grid can be generated for display from which a television program and advertisement time slot can be selected to display the targeted advertisement for viewing. Confirmation to purchase the targeted advertisement for delivery to the recipients can also be received to initiate the targeted advertisement being displayed for viewing during the selected television program and advertisement time slot.

20 Claims, 5 Drawing Sheets

U.S. PATENT DOCUMENTS

| | | | |
|---|---|---|---|
| 2003/0229900 A1* | 12/2003 | Reisman | 725/87 |
| 2004/0044622 A1* | 3/2004 | Blott et al. | 705/40 |
| 2004/0133467 A1* | 7/2004 | Siler | 705/14 |
| 2004/0163107 A1* | 8/2004 | Crystal | 725/32 |
| 2004/0193488 A1* | 9/2004 | Khoo et al. | 705/14 |
| 2005/0254443 A1 | 11/2005 | Campbell et al. | |
| 2005/0289630 A1* | 12/2005 | Andrews et al. | 725/116 |
| 2006/0293949 A1 | 12/2006 | Grossnickle et al. | |
| 2007/0050372 A1* | 3/2007 | Boyle | 707/10 |
| 2007/0113243 A1* | 5/2007 | Brey | 725/32 |
| 2007/0113244 A1* | 5/2007 | Verschueren et al. | 725/35 |
| 2007/0198532 A1 | 8/2007 | Krikorian et al. | |
| 2007/0255801 A1 | 11/2007 | Adler | |
| 2007/0291747 A1 | 12/2007 | Stern et al. | |
| 2008/0092182 A1* | 4/2008 | Conant | 725/109 |
| 2008/0162228 A1* | 7/2008 | Mechbach et al. | 705/7 |
| 2008/0184287 A1* | 7/2008 | Lipscomb | 725/32 |
| 2008/0255944 A1 | 10/2008 | Shah et al. | |
| 2008/0300983 A1* | 12/2008 | Chen et al. | 705/14 |
| 2008/0307454 A1* | 12/2008 | Ahanger et al. | 725/36 |
| 2009/0030802 A1* | 1/2009 | Plotnick et al. | 705/14 |

FOREIGN PATENT DOCUMENTS

| | | |
|---|---|---|
| KR | 1020070038027 A | 4/2009 |
| WO | WO 2007103655 A2 * | 9/2007 |

OTHER PUBLICATIONS

"International Search Report", Mailed Date: Aug. 9, 2010, Application No. PCT/US2010/021273, Filed Date: Jan. 15, 2010, pp. 10.

"Foreign Office Action", Chinese Application No. 201080007910.2, (Aug. 20, 2012), 9 pages.

* cited by examiner

USER GENERATED TARGETED ADVERTISEMENTS

BACKGROUND

An advertiser in a typical television advertising scenario seeks to reach as many television viewers as possible with a cost-effective television advertisement. Conventional advertisements are not intended to illicit an immediate business transaction via the television, but rather are generally intended to promote brand awareness and establish a viewer connection or trust in a product, service, or particular company and/or business. Advertisements are also intended to efficiently communicate a message to a large group of viewers, such as nationally, throughout a state, or citywide.

SUMMARY

This summary is provided to introduce simplified concepts of user generated targeted advertisements. The simplified concepts are further described below in the Detailed Description. This summary is not intended to identify essential features of the claimed subject matter, nor is it intended for use in determining the scope of the claimed subject matter.

User generated targeted advertisements is described. In embodiments, a selection of an advertisement template for a targeted advertisement can be received when initiated by a user. Advertisement content to incorporate in the advertisement template can be received, as well as selections of recipients to receive the targeted advertisement. A program grid can be generated for display from which a television program and advertisement time slot can be selected to display the targeted advertisement for viewing. Confirmation to purchase the targeted advertisement for delivery to the recipients can also be received to initiate the targeted advertisement being displayed for viewing during the selected television program and advertisement time slot.

In other embodiments, the advertisement content for the targeted advertisement can be communicated to client devices that each correspond to a recipient that is selected by the user to receive the targeted advertisement. Advertisement triggering data can also be communicated to the client devices, where the advertisement triggering data indicates when to initiate a display of the targeted advertisement for viewing at a client device during the selected television program and advertisement time slot.

In other embodiments, a trigger notification can be received from the client device at a beginning of the advertisement time slot to initiate the targeted advertisement being displayed for viewing at the client device. Display instructions can be generated to display the targeted advertisement for viewing at the client device. The display instructions can then be communicated to the client device that sequentially initiates the advertisement content for display as the targeted advertisement. Verification that the targeted advertisement was displayed for viewing at the client device can then be communicated to initiate billing the user for the targeted advertisement.

BRIEF DESCRIPTION OF THE DRAWINGS

Embodiments of user generated targeted advertisements are described with reference to the following drawings. The same numbers are used throughout the drawings to reference like features and components.

DETAILED DESCRIPTION

Embodiments of user generated targeted advertisements provide techniques for users or customers in a television content distribution system to create and send targeted advertisements and/or messages to each other in the form of television advertisements. The messages to others can include individual and/or personal messages and advertisements, as well as social-orientated messages, such as a party invitation to several recipients, an announcement to a church group or club members, or a small community message. A network-based service for a television content distributor can include an advertisement creation interface and an advertisement management interface that together enable a user to author a targeted advertisement, select recipients to receive the targeted advertisement, and select a television program and advertisement time slot in which to display the targeted advertisement for viewing. The user can then authorize payment for the targeted advertisement or message through a billing interface of the television content distributor. A multi-channel television distribution system can then deliver the targeted advertisement to the selected recipients via an individually-addressable advertisement targeting system.

While features and concepts of the described systems and methods for user generated targeted advertisements can be implemented in any number of different environments, systems, and/or various configurations, embodiments of user generated targeted advertisements are described in the context of the following example systems and environments.

Figure 1:
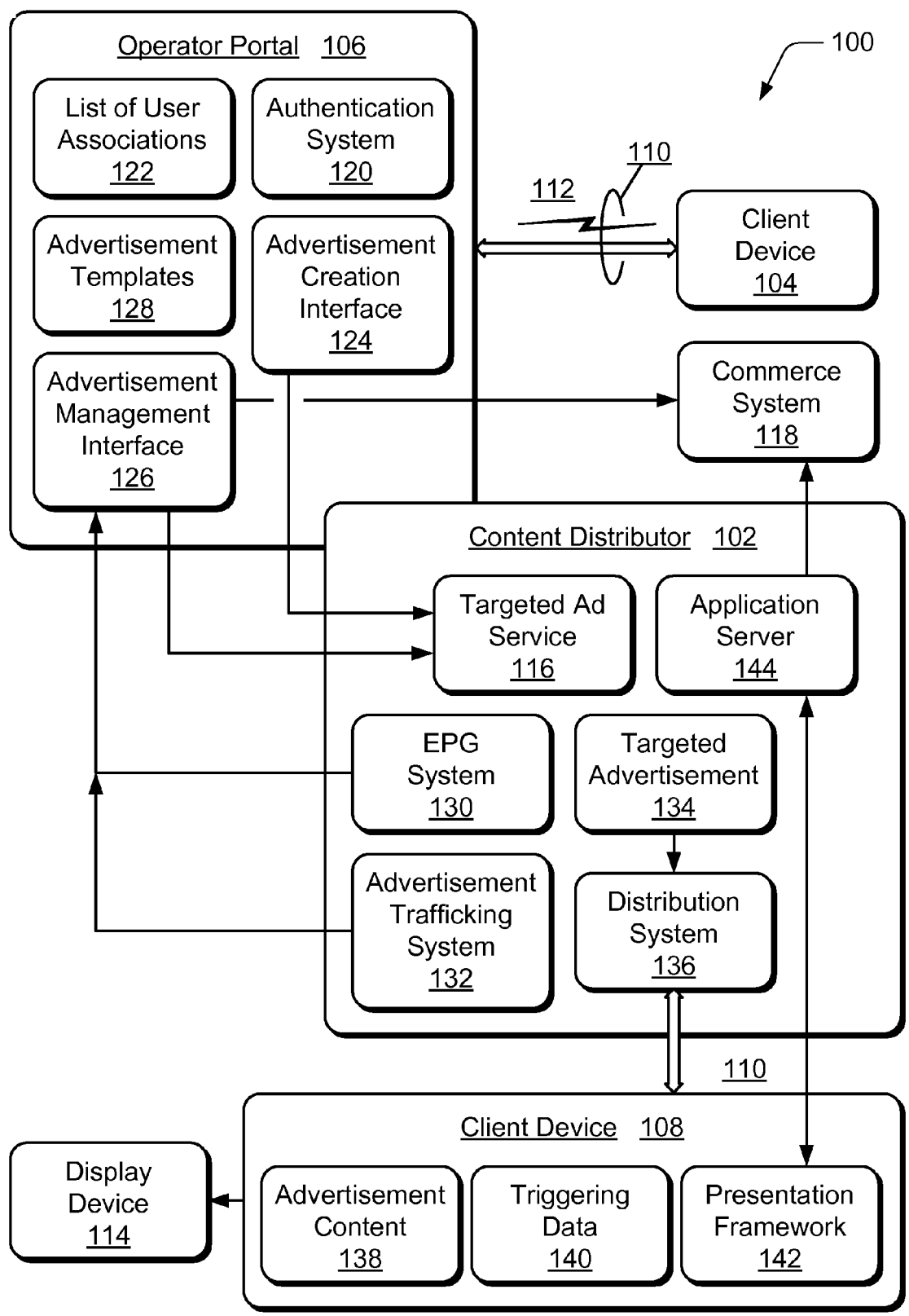
FIG. 1 illustrates an example system in which embodiments of user generated targeted advertisements can be implemented.

FIG. 1 illustrates an example targeted advertisement system 100 in which various embodiments of user generated targeted advertisements can be implemented. System 100 includes a content distributor 102, a first client device 104 via which a user can initiate a targeted advertisement through an operator portal 106 of the content distributor, and a second client device 108 via which a recipient can receive the targeted advertisement for viewing. The content distributor 102 and the various client devices are implemented for communication via communication networks 110.

In a television and/or media content distribution system, the content distributor 102 facilitates distribution of television content, content metadata, media content, and/or other associated data to multiple viewers, users, customers, subscribers, viewing systems, and/or client devices. The communication networks 110 can include any type of a data network, voice network, broadcast network, an IP-based network, and/or a wireless network 112 that facilitates communication of data and media content in any format. The communication networks 110 can be implemented using any type of network topology and/or communication protocol, and can be represented or otherwise implemented as a combination of two or more networks. In addition, any one or more of the arrowed communication links facilitate two-way data communication.

Media content (e.g., to include recorded media content) can include any type of audio, video, and/or image media content received from any media content source. As described herein, media content can include recorded video content, video-on-demand content, television content, television programs (or programming), advertisements, commercials, music, movies, video clips, and other on-demand media content. Other media content can include interactive games, network-based applications, and any other content or data (e.g., to include program guide application data, user interface data, advertising content, closed captions data, content metadata, search results and/or recommendations, etc.).

A client device in system 100 can be implemented as any one or combination of a wired and/or wireless device, as any form of television client device (e.g., television set-top box, digital video recorder (DVR), etc.), computer device, portable computer device, media device, communication device, video processing and/or rendering device, appliance device, gaming device, electronic device, and/or as any other type of device that can be implemented to receive media content in any form of audio, video, and/or image data. A client device may also be associated with a user (i.e., a person) and/or an entity that operates the device such that a device describes logical devices that include users, software, firmware, and/or a combination of devices.

The client devices in system 100 can also be implemented as components in client systems that each include a respective display device 114, and a client device and display device together render or playback any form of audio, video, and/or image content. A display device can be implemented as any type of a television, high definition television (HDTV), LCD, or similar display system. Various client devices (e.g., television, gaming, or computer devices) can also be associated with one or more input devices, such as a remote control device for user-selectable inputs to a television client device, a gaming controller for user-selectable inputs to a gaming device, and a keyboard and/or mouse input devices for user-selectable inputs to a computer device.

In this example targeted advertisement system 100, a user at client device 104 can create targeted advertisements and/or messages that are sent to other users as television advertisements. A targeted advertisement service 116 at the content distributor 102 includes the operator portal 106 and is a network-based service that can be implemented to facilitate a user creating a targeted advertisement. A user can also select recipients to receive the targeted advertisement, and select a television program and advertisement time slot in which to display the targeted advertisement for viewing. The user can also authorize payment for a targeted advertisement or message through a commerce system 118 that is associated with the content distributor 102.

For example, if a user at client device 104 knows that a friend watches a particular television program every night, and that tomorrow is the friend's birthday, the user can send a happy birthday message to the friend in the form of a targeted advertisement during the particular television program. Through the operator portal 106, the user can select a template for a birthday message as well as the associated content (e.g., a picture, graphic, text, image, audio, video clip, etc.) to incorporate in the template. The user can select the friend from a buddy list as a recipient of the targeted advertisement. The user can also select the particular program from a television broadcast schedule, as well as an advertisement time slot during the program in which to display the targeted advertisement for viewing. The user can then authorize payment for the targeted advertisement and/or agree to a service charge. Then during the scheduled broadcast of the selected program, and at the selected advertisement time slot, the targeted advertisement will be displayed for viewing on display device 114 at client device 108 and the friend will receive the birthday message that was initiated by the user.

The operator portal 106 for content distributor 102 includes an authentication system 120 that can be implemented to receive an input of authentication data that identifies a user in the targeted advertisement system, such as from a user at client device 104. The authentication system 120 can then authenticate the user according to the authentication data to allow the user to initiate, or create a targeted advertisement. The authentication data can include any form of user login data or other associated customer identification information. The data that is associated with the user at client device 104 can also be associated with other users in the targeted advertisement system, such as in the list of user associations 122 at the operator portal 106. The list of user associations 122 can be any form of buddy list or other list obtained or accessed from a social networking site.

The operator portal 106 also includes an advertisement creation interface 124 and an advertisement management interface 126. Although illustrated and described as independent software modules or applications, the advertisement creation interface 124 and the advertisement management interface 126, as well as other functionality to implement the various embodiments described herein, can be implemented together as a single application or service.

The advertisement creation interface 124 can be implemented to receive a selection of an advertisement template 128 when initiated by the user at client device 104 for a targeted advertisement. An advertisement template 128 can include pre-defined storyboards that are appropriate for various occasions, such as for birthdays, holidays, anniversaries, and the like. An advertisement template 128 can also include a format for the user at client device 104 to upload a pre-production video clip or advertisement spot as the targeted advertisement. The advertisement creation interface 124 can also be implemented to receive advertisement content to incorporate in the advertisement template, such as a photo, graphic, text, image, audio, video clip, and the like. Advertisement content can be uploaded via the operator portal 106 by the user at client device 104.

The advertisement creation interface 124 can be implemented to then generate a preview of the targeted advertisement from the advertisement template incorporated with the advertisement content, and initiate a display of the preview of the targeted advertisement for review by the user. The advertisement creation interface 124 can incorporate the advertisement content in the advertisement template, bind the template to an interactive television application, and play back the storyboard sequence in an interactive television simulator, such as via a Web page. In an embodiment, the advertisement creation interface 124 can be implemented as a network-based application that can be linked into from the operator portal 106, and can provide the pass-through authentication and user data to associate a user with others according to the list of user associations 122.

The advertisement management interface 126 can be implemented to correlate the user at client device 104 with recipients from the list of user associations 122 that can then be selected to receive the targeted advertisement. The advertisement management interface 126 can receive a selection of a recipient to receive the targeted advertisement, such as when the recipient that corresponds to client device 108 is selected to receive the targeted advertisement by the user at client device 104.

The advertisement management interface 126 can be implemented to interface with an electronic program guide system 130 at the content distributor 102 to facilitate user selection of a television program in which to display the targeted advertisement for viewing. In addition, the advertisement management interface 126 can be implemented to interface with an advertisement trafficking system 132 (also referred to as a trafficking and billing system) to facilitate selection of an advertisement time slot during the television program to display the targeted advertisement for viewing (e.g., at client device 108 for the selected recipient). The electronic program guide system 130 can be implemented to display a filtered grid that shows television channels and corresponding television programs in which the content distributor 102 has advertisement time slots (also referred to as avails) to sell, and which a user can select for distribution of a targeted advertisement.

The advertisement management interface 126 can also be implemented to receive confirmation or authorization to purchase the targeted advertisement from the user at client device 104, and communicate the authorization to the commerce system 118 that is associated with distribution of content from the content distributor 102. In an embodiment, the advertisement management interface 126 can be implemented as a network-based application that can be linked into from the operator portal 106.

The content distributor 102 includes the targeted advertisement service 116 that receives the advertisement template, advertisement content, and display schedule for a targeted advertisement 134 via the operator portal 106. The targeted advertisement service 116 is an interface for a distribution system 136 at the content distributor 102. The distribution system 136 is implemented to communicate the advertisement content 138 for the targeted advertisement 134 to client devices that each correspond to a recipient that is selected to receive the targeted advertisement. For example, client device 108 receives the advertisement content 138 for a targeted advertisement 134 from the distribution system 136 at content distributor 102, and the client device 108 can include a content store to maintain the advertisement content 138 until the targeted advertisement 134 is scheduled for display.

The distribution system 136 is also implemented to communicate advertisement triggering data 140 to the client devices to indicate when to initiate a display of the targeted advertisement 134 for viewing at a client device during a selected television program and advertisement time slot. For example, client device 108 receives the advertisement triggering data 140 for a targeted advertisement 134 from the distribution system 136 at content distributor 102. The advertisement triggering data 140 can include metadata that identifies the particular television program, a time that identifies the advertisement time slot, the avail ID, and an interactive application ID that is utilized when the targeted advertisement is scheduled for display as an advertisement at a client device. The distribution system 136 can be implemented as a multicast or broadcast carousel, and/or targeted advertisements can be delivered via unicast messages to individual client devices.

The client device 108 includes a presentation framework 142 that can be implemented to periodically poll a presentation framework trigger database (e.g., at client device 108) for targeted advertisement triggers. When the client device 108 is tuned to a trigger-enabled channel near a trigger definition time, the presentation framework 142 can monitor advertisement insertion messages in an audio-video stream. When an insertion message for an avail ID that corresponds to the display time of the targeted advertisement 134 is determined, the presentation framework 142 initiates a call to an application server 144 at content distributor 102. The application server 144 can be implemented as an interactive television application that executes a sequence defined in an advertisement template to incorporate the advertisement content to display the targeted advertisement for viewing.

The application server 144 at content distributor 102 can be implemented to receive a trigger notification from the client device 108 at a beginning of the advertisement time slot to initiate the targeted advertisement 134 being displayed for viewing at the client device. The application server 144 can also be implemented to then generate display instructions to display the targeted advertisement for viewing at the client device, and communicate the display instructions to the client device 108 that sequentially initiates the advertisement content for display as the targeted advertisement.

The application server 144 can also be implemented to communicate verification to the commerce system 118 that the targeted advertisement 134 was displayed for viewing at the client device 108 to initiate billing the user for the targeted advertisement (e.g., billing the user at client device 104 where the targeted advertisement was initiated and created). The application server 144 receives a report that indicates successful completion of the targeted advertisement, and then forwards the report to the commerce system 118 for reconciliation and billing of the user who initiated the targeted advertisement.

Example methods 200-400 are described with reference to respective FIGS. 2-4 in accordance with one or more embodiments of user generated targeted advertisements. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a computing-based processor. The example method(s) may be described in the general context of computer-executable instructions, which can include software, applications, routines, programs, objects, components, data structures, procedures, modules, functions, and the like.

The method(s) may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 2:
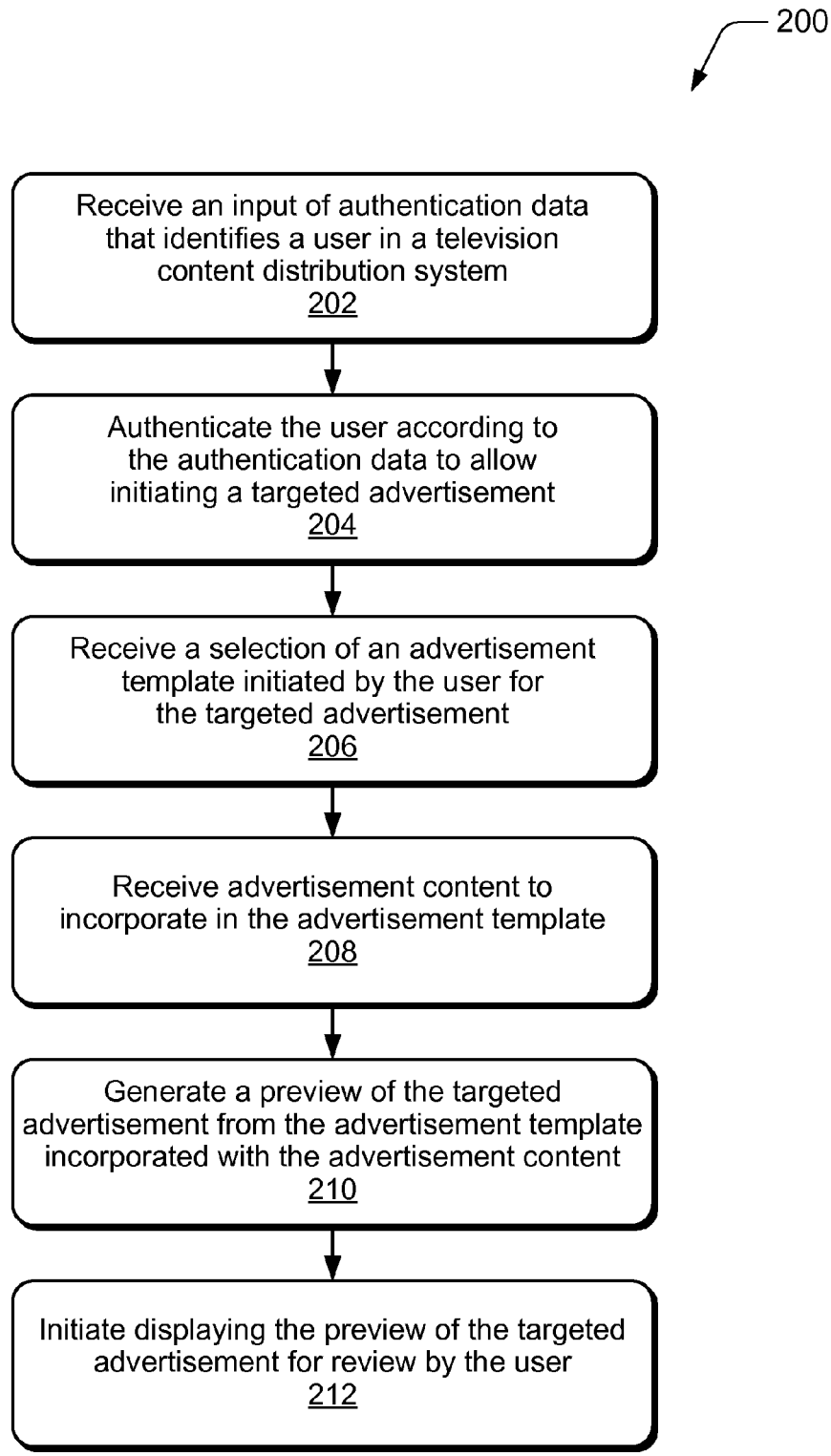
FIG. 2 illustrates example method(s) for user generated targeted advertisements in accordance with one or more embodiments.

FIG. 2 illustrates example method(s) 200 of user generated targeted advertisements. The order in which the method is described is not intended to be construed as a limitation, and any number of the described method blocks can be combined in any order to implement the method, or an alternate method.

At block 202, an input of authentication data is received that identifies a user in a television content distribution system. For example, the authentication system 120 at operator portal 106 (FIG. 1) receives an input of authentication data that identifies a user in the targeted advertisement system 100, such as from a user at client device 104. At block 204, the user is authenticated according to the authentication data to allow initiating a targeted advertisement. For example, the authentication system 120 authenticates the user according to the authentication data to allow the user to initiate, or create a targeted advertisement. The authentication data can include any form of user login data or other associated customer identification information.

At block 206, a selection of an advertisement template initiated by the user for the targeted advertisement is received. For example, the advertisement creation interface 124 receives a selection of an advertisement template 128 when initiated by the user at client device 104 for a targeted advertisement. At block 208, advertisement content is received to incorporate in the advertisement template. For example, the advertisement creation interface 124 also receives advertisement content to incorporate in the advertisement template, such as a photo, graphic, text, image, audio, video clip, and the like. The advertisement content is uploaded via the operator portal 106 by the user at client device 104.

At block 210, a preview of the targeted advertisement is generated from the advertisement template incorporated with the advertisement content. At block 212, the preview of the targeted advertisement is displayed for review by the user. For example, the advertisement creation interface 124 generates a preview of the targeted advertisement from the advertisement template 128 incorporated with the advertisement content, and initiates a display of the preview of the targeted advertisement for review by the user via the operator portal 106.

Figure 3:
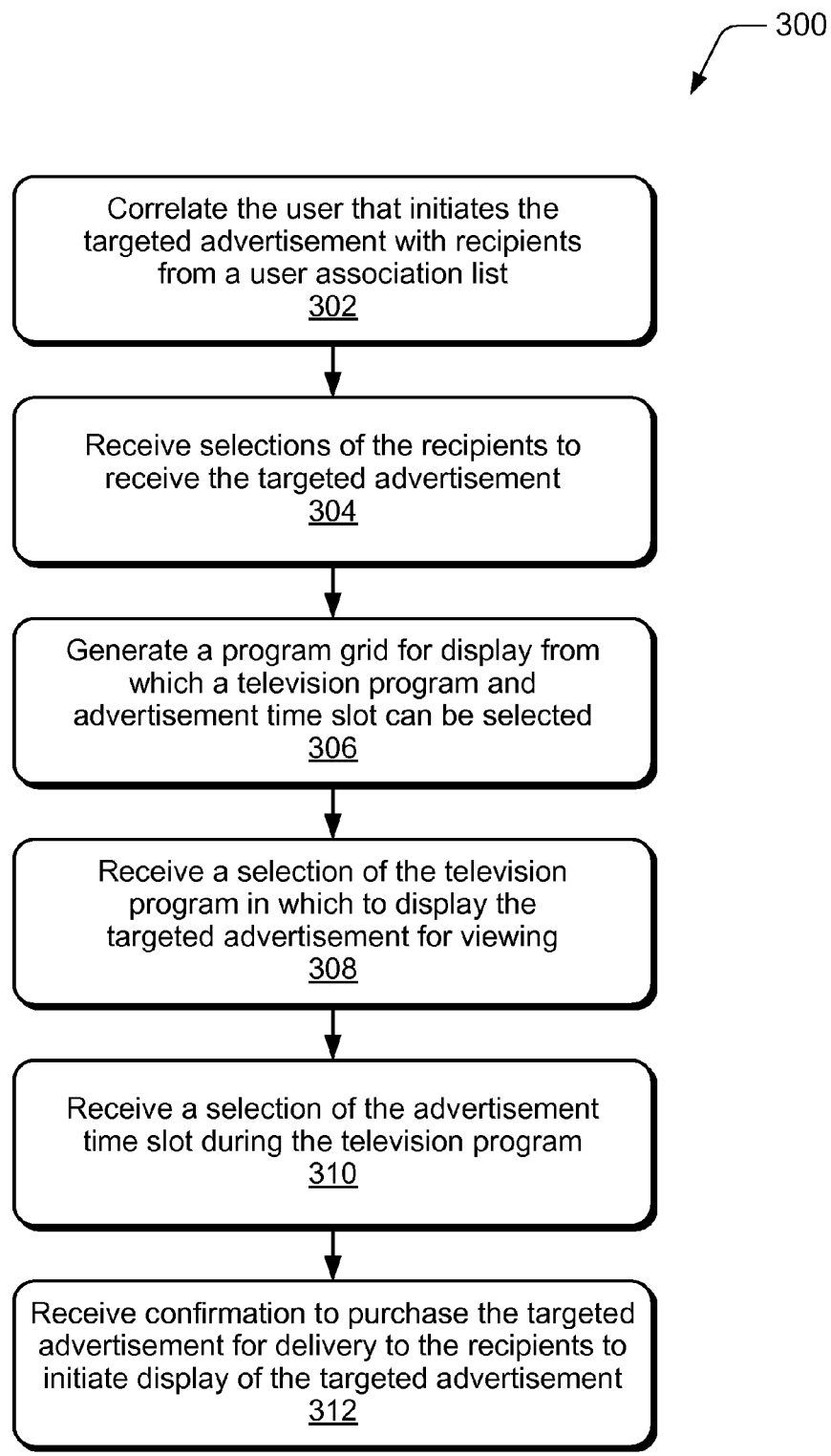
FIG. 3 illustrates example method(s) for user generated targeted advertisements in accordance with one or more embodiments.

FIG. 3 illustrates example method(s) 300 of user generated targeted advertisements. The order in which the method is described is not intended to be construed as a limitation, and any number of the described method blocks can be combined in any order to implement the method, or an alternate method.

At block 302, the user that initiates the targeted advertisement is correlated with recipients from a user association list. For example, the advertisement management interface 126 correlates the user at client device 104 with recipients from the list of user associations 122 that can then be selected to receive the targeted advertisement. At block 304, selections of the recipients to receive the targeted advertisement are received. For example, the advertisement management interface 126 receives a selection of a recipient to receive the targeted advertisement, such as when the recipient that corresponds to client device 108 is selected to receive the targeted advertisement by the user at client device 104.

At block 306, a program grid is generated for display from which a television program and advertisement time slot can be selected in which to display the targeted advertisement for viewing. For example, the advertisement management interface 126 interfaces with the electronic program guide system 130 at the content distributor 102 to facilitate user selection of a television program in which to display the targeted advertisement for viewing. The advertisement management interface 126 also interfaces with the advertisement trafficking system 132 to facilitate selection of an advertisement time slot during the television program to display the targeted advertisement for viewing.

At block 308, a selection of the television program in which to display the targeted advertisement for viewing is received and, at block 310, a selection of the advertisement time slot during the television program is received. For example, the advertisement management interface 126 receives user selections of a television program and an advertisement time slot in which have the targeted advertisement 134 displayed for viewing by one or more selected recipients of the targeted advertisement.

At block 312, confirmation is received to purchase the targeted advertisement for delivery to the recipients to initiate the targeted advertisement being displayed for viewing during the selected television program and advertisement time slot. For example, the advertisement management interface 126 receives confirmation or authorization to purchase the targeted advertisement from the user at client device 104, and communicates the authorization to the commerce system 118 that is associated with the content distributor 102.

Figure 4:
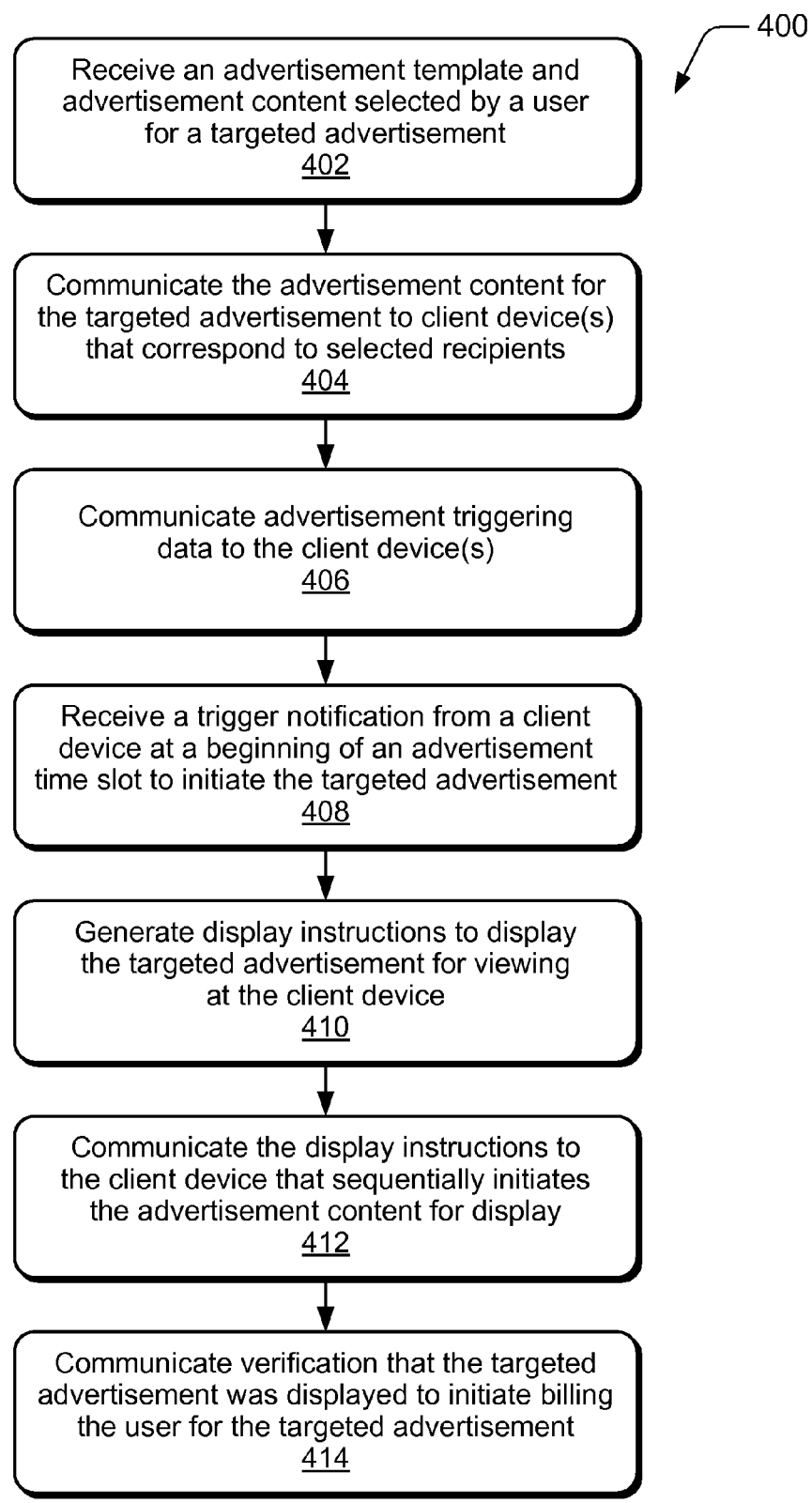
FIG. 4 illustrates example method(s) for user generated targeted advertisements in accordance with one or more embodiments.

FIG. 4 illustrates example method(s) 400 of user generated targeted advertisements. The order in which the method is described is not intended to be construed as a limitation, and any number of the described method blocks can be combined in any order to implement the method, or an alternate method.

At block 402, an advertisement template and advertisement content that is selected by a user for a targeted advertisement is received. For example, the targeted advertisement service 116 at content distributor 102 receives the advertisement template, advertisement content, and display schedule for a targeted advertisement 134 via the operator portal 106.

At block 404, the advertisement content for the targeted advertisement is communicated to one or more client devices that each correspond to a recipient that is selected by the user to receive the targeted advertisement. For example, the distribution system 136 at content distributor 102 communicates the advertisement content 138 for the targeted advertisement 134 to client devices that each correspond to a recipient that is selected to receive the targeted advertisement. Client device 108 receives the advertisement content 138 for a targeted advertisement 134 from the distribution system 136 at content distributor 102.

At block 406, advertisement triggering data is communicated to the one or more client devices. For example, the distribution system 136 at content distributor 102 also communicates advertisement triggering data 140 to the client devices to indicate when to initiate a display of the targeted advertisement 134 for viewing at a client device during a selected television program and advertisement time slot. Client device 108 receives the advertisement triggering data 140 for a targeted advertisement 134 from the distribution system 136 at content distributor 102.

At block 408, a trigger notification is received from the client device at a beginning of the advertisement time slot to initiate the targeted advertisement being displayed for viewing at the client device. For example, the application server 144 at content distributor 102 receives a trigger notification from the client device 108 at a beginning of the advertisement time slot to initiate the targeted advertisement 134 being displayed for viewing at the client device.

At block 410, display instructions are generated to display the targeted advertisement for viewing at the client device. For example, the application server 144 at content distributor 102 then generates display instructions to display the targeted advertisement for viewing at the client device 108. At block 412, the display instructions are communicated to the client device that sequentially initiates the advertisement content for display as the targeted advertisement. For example, the application server 144 at content distributor 102 initiates communication of the display instructions to the client device 108 that sequentially initiates the advertisement content for display as the targeted advertisement.

At block 414, verification that the targeted advertisement was displayed for viewing at the client device is communicated to initiate billing the user for the targeted advertisement. For example, the application server 144 at content distributor 102 communicates verification to the commerce system 118 that the targeted advertisement 134 was displayed for viewing at the client device 108 to initiate billing the user for the targeted advertisement (e.g., billing the user at client device 104 where the targeted advertisement was initiated and created).

Figure 5:
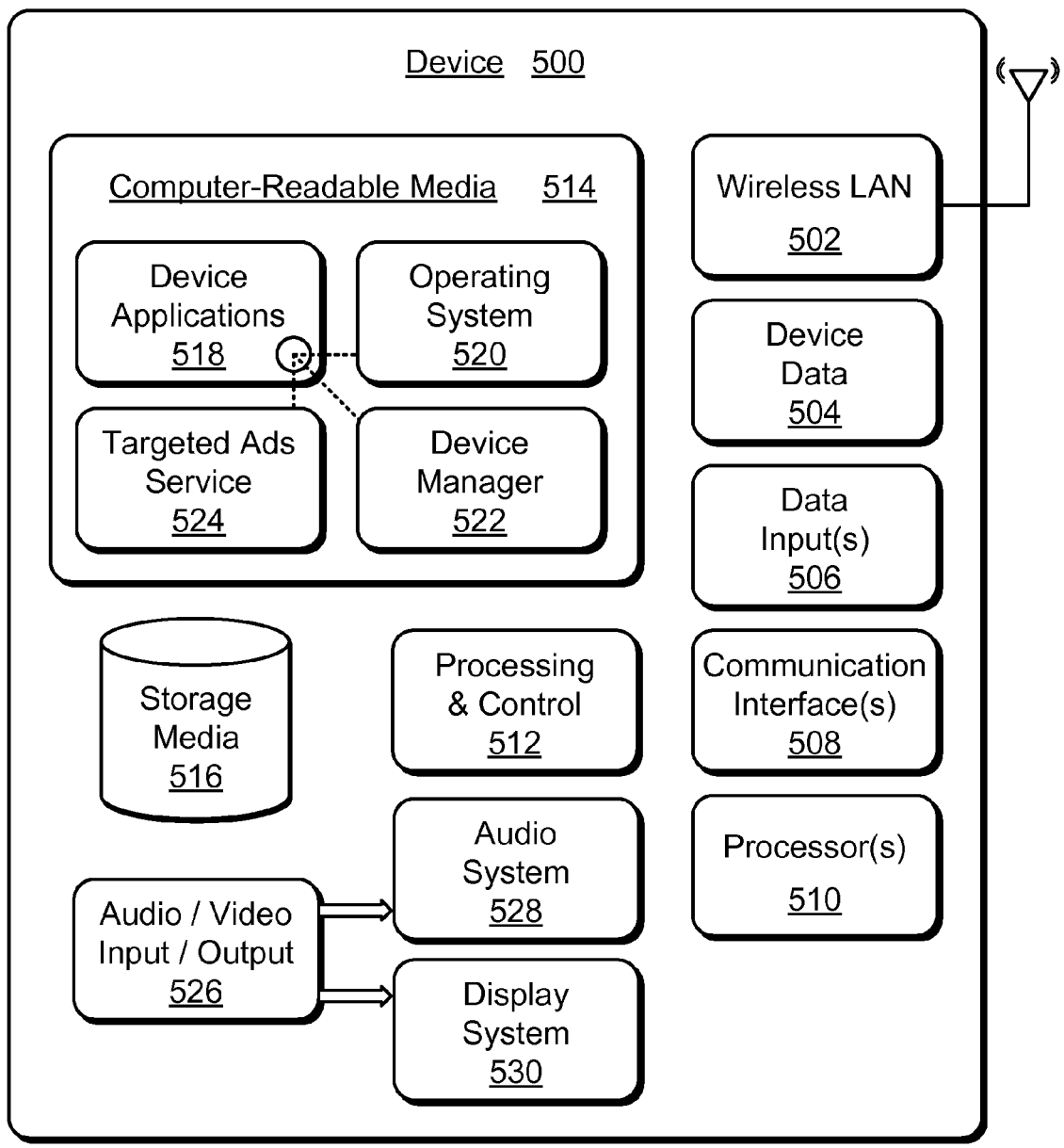
FIG. 5 illustrates various components of an example device that can implement embodiments of user generated targeted advertisements.

FIG. 5 illustrates various components of an example device 500 that can be implemented as any type of client device and/or content distributor as described with reference to FIG. 1 to implement embodiments of user generated targeted advertisements. In embodiment(s), device 500 can be implemented as any one or combination of a wired and/or wireless device, as any form of television client device (e.g., television set-top box, digital video recorder (DVR), etc.), computer device, portable computer device, media device, communication device, video processing and/or rendering device, appliance device, gaming device, electronic device, and/or as any other type of device. Device 500 may also be associated with a user (i.e., a person) and/or an entity that operates the device such that a device describes logical devices that include users, software, firmware, and/or a combination of devices.

If device 500 is implemented as a wireless device, the device can include wireless LAN (WLAN) components 502 that enable wireless communication of device data 504 (e.g., received data, data that is being received, data scheduled for broadcast, data packets of the data, etc.). The device data 504 or other device content can include configuration settings of the device, media content stored on the device, and/or information associated with a user of the device. Media content stored on device 500 can include any type of audio, video, and/or image media content. Device 500 can also include one or more data inputs 506 via which any type of data, media content, and/or inputs can be received, such as music, television media content, recorded video content, and any other type of audio, video, and/or image content received from a content source which can then be processed, rendered, and/or displayed for viewing.

Device 500 can also include communication interfaces 508 that can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices can communicate data with device 500.

Device 500 can include one or more processors 510 (e.g., any of microprocessors, controllers, and the like) which process various computer-executable instructions to control the operation of device 500 and to implement embodiments of user generated targeted advertisements. Alternatively or in addition, device 500 can be implemented with any one or combination of hardware, firmware, or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 can also include computer-readable media 514, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like. Device 500 can also include a mass storage media device 516.

Computer-readable media 514 provides data storage mechanisms to store the device data 504, as well as various device applications 518 and any other types of information and/or data related to operational aspects of device 500. For example, an operating system 520 can be maintained as a computer application with the computer-readable media 514 and executed on processors 510. The device applications 518 can include a device manager 522 (e.g., a control application, software application, signal processing and control module, code that is native to a particular device, a hardware abstraction layer for a particular device, etc.). The device applications 518 can also include any system components or modules of a targeted advertisements service 524 to implement embodiments of user generated targeted advertisements. In this example, the device applications 518 are shown as software modules and/or computer applications.

Device 500 can also include an audio and/or video input-output system 526 that provides audio data to an audio system 528 and/or provides video data to a display system 530. The audio system 528 and/or the display system 530 can include any devices that process, display, and/or otherwise render audio, video, and image data. Video signals and audio signals can be communicated from device 500 to an audio device and/or to a display device via an RF (radio frequency) link, S-video link, composite video link, component video link, DVI (digital video interface), analog audio connection, or other similar communication link. In an embodiment, audio system 528 and/or the display system 530 can be implemented as external components to device 500. Alternatively, the audio system 528 and/or the display system 530 can be implemented as integrated components of example device 500.

Although embodiments of user generated targeted advertisements have been described in language specific to features and/or methods, it is to be understood that the subject of the appended claims is not necessarily limited to the specific features or methods described. Rather, the specific features and methods are disclosed as example implementations of user generated targeted advertisements.

The invention claimed is:

1. A method, comprising:
   receiving a selection from a user to initiate a targeted advertisement;
   receiving advertisement content to incorporate in the targeted advertisement;
   receiving one or more user selections of designated recipients to receive the targeted advertisement;
   interfacing with an electronic program guide system to generate a filtered program grid for display on a user device that shows television channels and corresponding television programs in which advertisement time slots are for sale, from which a television program and a specific advertisement time slot in which to display the targeted advertisement for viewing by a user-designated recipient is selected; and
   receiving confirmation to purchase the targeted advertisement for delivery to the designated recipients to initiate the targeted advertisement being displayed for viewing during the selected television program and the specific advertisement time slot.

2. A method as recited in claim 1, further comprising receiving the selection of an advertisement template for the targeted advertisement.

3. A method as recited in claim 1, further comprising:
receiving a selection of the television program in which to display the targeted advertisement for viewing; and
receiving a selection of the specific advertisement time slot during the television program.

4. A method as recited in claim 1, further comprising correlating the user that initiates the targeted advertisement with one or more of the designated recipients from a user association list.

5. A method as recited in claim 1, further comprising:
receiving an input of authentication data that identifies the user in a television content distribution system; and
authenticating the user according to the authentication data to allow initiating the targeted advertisement.

6. A method as recited in claim 1, further comprising:
generating a preview of the targeted advertisement from the advertisement content; and
initiating displaying the preview of the targeted advertisement for review by the user.

7. A method as recited in claim 1, further comprising communicating the advertisement content for the targeted advertisement to one or more client devices that each corresponds to a designated recipient that is selected by the user to receive the targeted advertisement.

8. A method as recited in claim 1, further comprising communicating advertisement triggering data to one or more client devices that each corresponds to a designated recipient that is selected by the user to receive the targeted advertisement, the advertisement triggering data indicating when to initiate the targeted advertisement being displayed for viewing at a client device during the selected television program and the specific advertisement time slot.

9. A method, comprising:
receiving an advertisement template and advertisement content that is selected by a user for a targeted advertisement to be displayed in a user-selected advertisement time slot at one or more client devices as a part of an audio-video stream, the time slot being selected by the user from a filtered program grid of television channels and corresponding television programs in which advertisement time slots are for sale;
communicating the advertisement content for the targeted advertisement to the one or more client devices that each corresponds to a recipient that is selected by the user to receive the targeted advertisement;
communicating advertisement triggering data to the one or more client devices, the advertisement triggering data indicating when to initiate the targeted advertisement being displayed for viewing at a client device during a selected television program in the user-selected advertisement time slot; and
receiving a trigger notification from the client device at a beginning of the advertisement time slot to initiate the targeted advertisement being displayed for viewing at the client device, the trigger notification initiated by the client device detecting an advertisement insertion message in the audio-video stream that corresponds to the advertisement triggering data.

10. A method as recited in claim 9, further comprising:
generating display instructions to display the targeted advertisement for viewing at the client device; and
communicating the display instructions to the client device that sequentially initiates the advertisement content for display as the targeted advertisement.

11. A method as recited in claim 9, further comprising communicating verification that the targeted advertisement was displayed for viewing at the client device to initiate billing the user for the targeted advertisement.

12. A targeted advertisement system, comprising:
a memory and processor to implement a targeted advertisement service configured to facilitate generation of a targeted advertisement via an advertisement creation interface and an advertisement management interface;
the advertisement creation interface via which a content distributor is configured to receive a user selection to initiate the targeted advertisement for delivery during a user-selected television program in an advertisement time slot associated with an avail ID, and receive advertisement content to incorporate in the targeted advertisement;
the advertisement management interface via which the content distributor is configured to receive one or more selections of recipients to receive the targeted advertisement, and receive confirmation to purchase the targeted advertisement; and
a content distribution system configured to:
communicate the advertisement content for the targeted advertisement to one or more client devices that each corresponds to a recipient that is selected to receive the targeted advertisement, and
communicate advertisement triggering data that includes the avail ID to the one or more client devices that each store the advertisement triggering data in respective trigger databases, a trigger database periodically polled for the advertisement triggering data that indicates when to initiate a display of the targeted advertisement for viewing when an insertion message corresponds to the avail ID.

13. A targeted advertisement system as recited in claim 12, wherein the advertisement creation interface is further configured to receive a selection of an advertisement template to initiate the targeted advertisement.

14. A targeted advertisement system as recited in claim 12, wherein the advertisement management interface is further configured to:
interface with an electronic program guide to facilitate selection of the selected television program in which to display the targeted advertisement for viewing; and
interface with an advertisement trafficking system to facilitate selection of the advertisement time slot during the selected television program to display the targeted advertisement for viewing.

15. A targeted advertisement system as recited in claim 12, wherein the advertisement management interface is further configured to correlate the user that initiates the targeted advertisement with one or more of the recipients from a user association list.

16. A targeted advertisement system as recited in claim 12, further comprising an authentication system configured to:
receive an input of authentication data that identifies the user in the targeted advertisement system; and
authenticate the user according to the authentication data to allow the user to initiate the targeted advertisement.

17. A targeted advertisement system as recited in claim 12, wherein the advertisement creation interface is further configured to:
generate a preview of the targeted advertisement from the advertisement content; and
initiate a display of the preview of the targeted advertisement for review by the user.

18. A targeted advertisement system as recited in claim 12, further comprising a content distribution system configured to communicate the advertisement triggering data to the one or more client devices that each corresponds to a recipient that is selected by the user to receive the targeted advertisement, the advertisement triggering data indicating when to initiate the targeted advertisement being displayed for viewing at a client device during the selected television program and the advertisement time slot.

19. A targeted advertisement system as recited in claim 18, further comprising an application server configured to:
receive a trigger notification from the client device at a beginning of the advertisement time slot to initiate the targeted advertisement being displayed for viewing at the client device;
generate display instructions to display the targeted advertisement for viewing at the client device; and
communicate the display instructions to the client device that sequentially initiates the advertisement content for display as the targeted advertisement.

20. A targeted advertisement system as recited in claim 19, wherein the application server is further configured to communicate verification that the targeted advertisement was displayed for viewing at the client device to initiate billing the user for the targeted advertisement.

* * * * *